United States Patent [19]
Butuk et al.

[11] Patent Number: 4,834,004
[45] Date of Patent: May 30, 1989

[54] AIR SEEDER SAMPLE COLLECTOR

[75] Inventors: Fred N. Butuk, Insinger; Glenn M. Hantke, Yorkton, both of Canada

[73] Assignee: Morris Rod-Weeder Co. Ltd., Yorkton, Canada

[21] Appl. No.: 44,064

[22] Filed: Apr. 29, 1987

[51] Int. Cl.$^4$ .............. B65G 51/24; B65G 53/56; B65G 53/60; B60P 1/60
[52] U.S. Cl. .............. 111/200; 406/182; 406/171; 406/41; 111/903
[58] Field of Search .............. 111/1, 34, 77, 80, 73; 406/181–183, 1, 155, 41, 164–166, 159, 171, 168, 157; 73/863.52

[56] References Cited

U.S. PATENT DOCUMENTS

| | | |
|---|---|---|
| 1,339,240 | 5/1920 | Travis .............. 406/171 |
| 1,567,536 | 12/1925 | Miller .............. 111/1 |
| 3,163,472 | 12/1964 | Zeismer .............. 406/171 |
| 3,631,825 | 5/1920 | Weiste . |
| 4,246,695 | 10/1981 | Quanbeck .............. 111/34 |
| 4,379,664 | 12/1925 | Klein et al. . |
| 4,453,866 | 12/1964 | Ryan . |
| 4,473,016 | 10/1981 | Gust . |
| 4,646,941 | 3/1987 | Grosse-Scharmann et al. .............. 111/1 |

FOREIGN PATENT DOCUMENTS

| | | | |
|---|---|---|---|
| 113374 | 7/1941 | Australia .............. 406/182 | |
| 1002576 | 7/1941 | Canada . | |
| 1060720 | 11/1958 | Canada . | |
| 601787 | 7/1960 | Canada .............. 111/1 | |
| 1031802 | 7/1960 | Canada . | |
| 1043173 | 12/1971 | Canada . | |
| 1094613 | 4/1983 | Canada . | |
| 1097149 | 11/1983 | Canada . | |
| 1040483 | 1/1985 | Canada . | |
| 1107571 | 7/1985 | Canada . | |
| 1190439 | 7/1985 | Canada . | |
| 1011602 | 3/1987 | Canada . | |
| 1126587 | 1/1989 | Canada . | |
| 2025039 | 12/1971 | Fed. Rep. of Germany .............. 111/34 |
| 3325542 | 1/1985 | Fed. Rep. of Germany .............. 111/1 |
| 584719 | 11/1958 | Italy .............. 111/1 |
| 1012820 | 4/1983 | U.S.S.R. .............. 111/1 |
| 1055371 | 11/1983 | U.S.S.R. .............. 111/1 |

OTHER PUBLICATIONS

Danton DeMille, 9/14/88.

*Primary Examiner*—Danton D. DeMille
*Attorney, Agent, or Firm*—Hovey, Williams, timmons & Collins

[57] ABSTRACT

The air seeder has a series of rotors which deliver a plurality of metered seed streams from a hopper and into a corresponding plurality of transfer condutis. The downstream ends of the transfer conduits are grouped together by a plate for quick and easy movement as a unit. The plate may be either coupled with a panel for delivery of the seed streams to delivery conduits for distribution of the seeds to the ground behind furrow openers or coupled with a sample collector inlet for collection of the seed streams therein. During normal planting operation the rotors are ground driven so as to meter an amount of seeds corresponding to the acreage traversed by the implement. During sampling, the rotors are manually operated so as to deliver a sample corresponding to a certain sample acreage. The sample is collected in the sample collector and the metered seed rate is determined by dividing the sample weight by the sample acreage. A transmission arrangement provides for adjustment of the metering rate of the rotors so that a desired metering rate may be obtained.

8 Claims, 3 Drawing Sheets

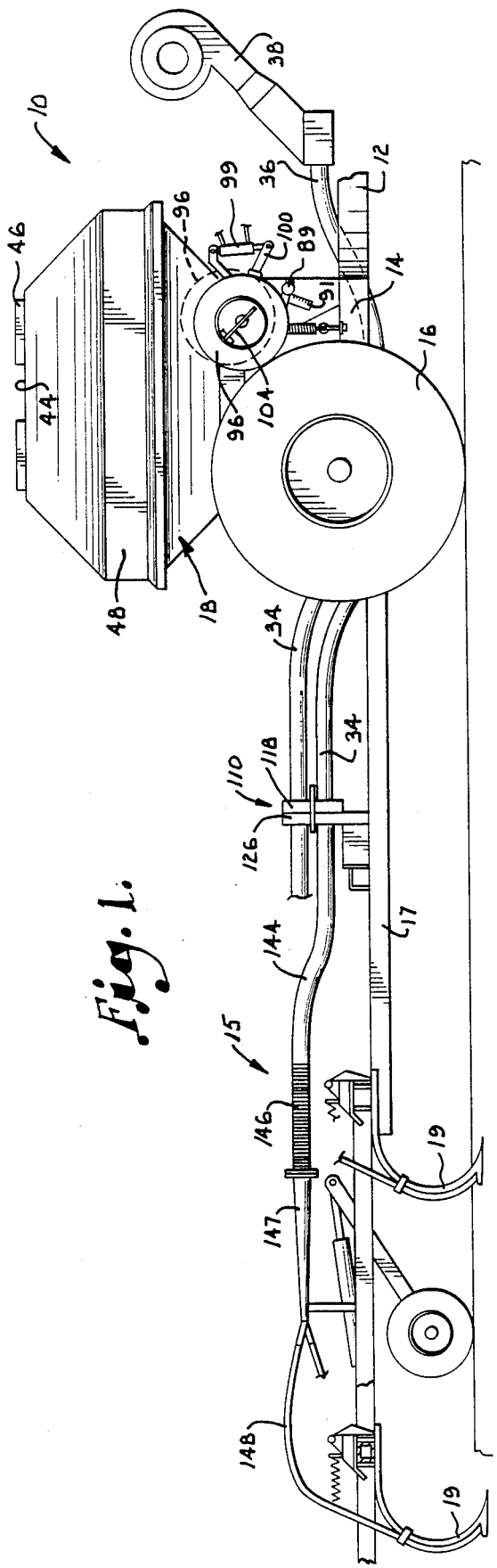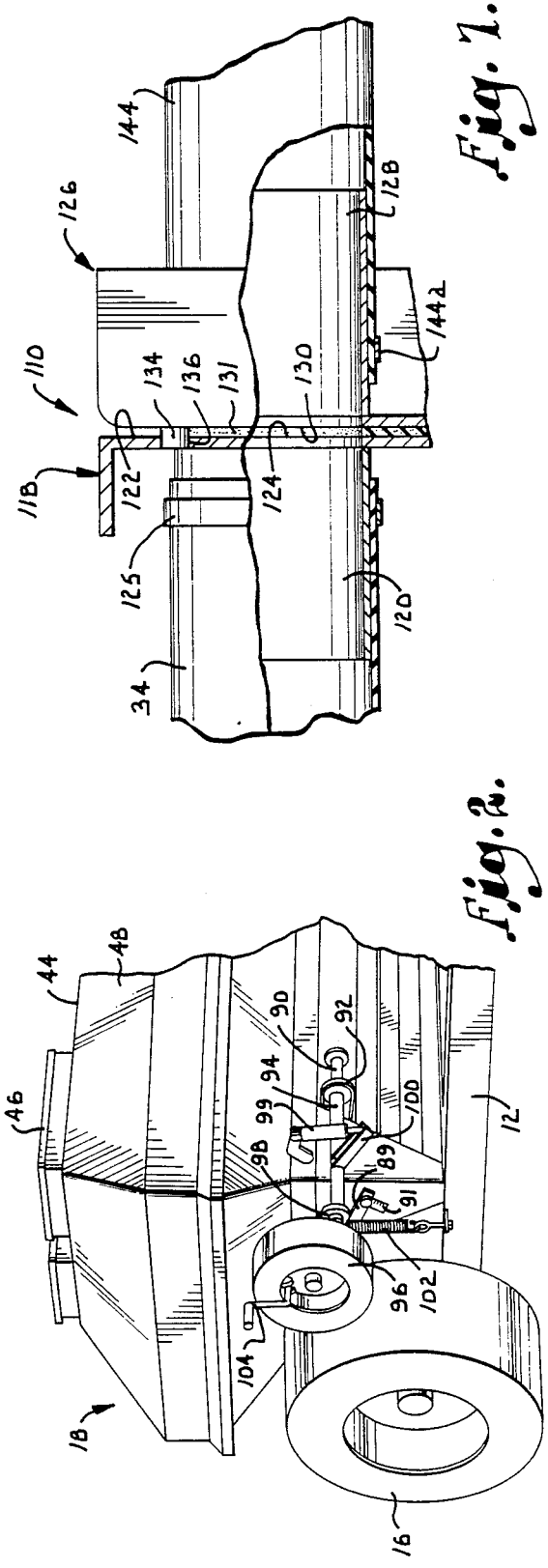

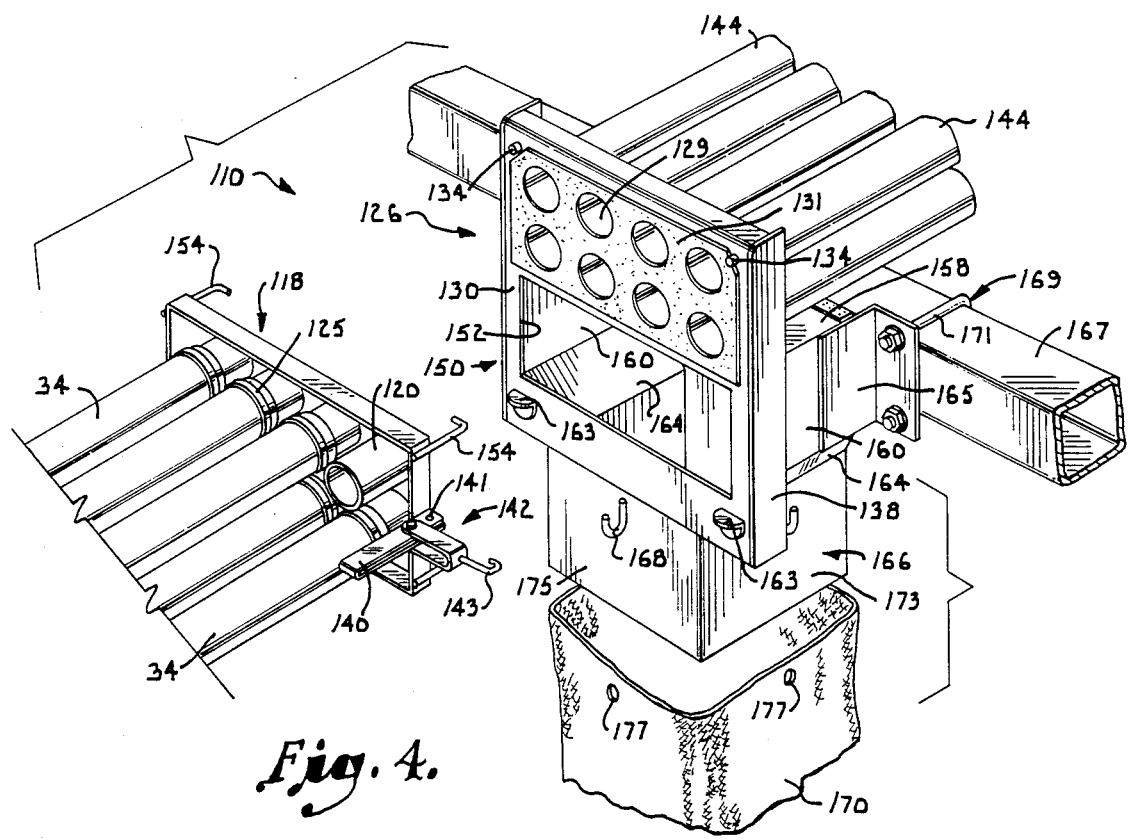
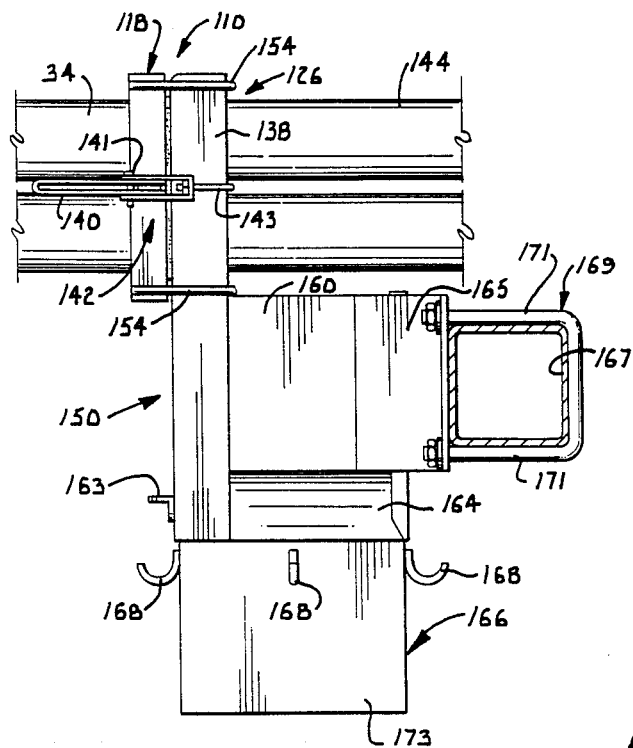
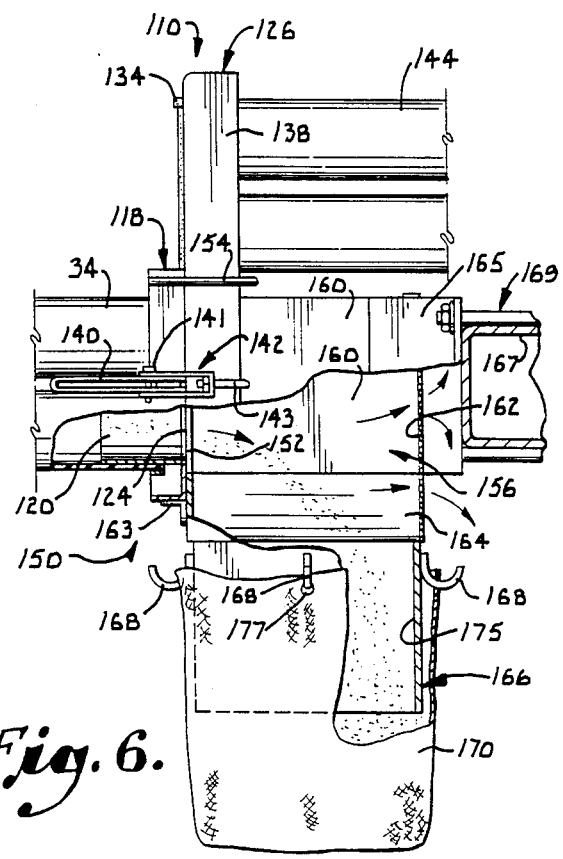
Fig. 4.
Fig. 5.
Fig. 6.

AIR SEEDER SAMPLE COLLECTOR

BACKGROUND OF THE INVENTION

1. Field of the Invention

The present invention generally relates to a device for determining the metered rate of granular materials such as seeds or fertilizer from an air seeder and, more particularly, is concerned with a device for collecting a plurality of metered air entrained streams of granular materials from an air seeder into a common sample for weighing. The plurality of metered streams are carried through a corresponding plurality of transfer conduits the downstream ends of which are grouped into a unit for either coupling with a corresponding grouped plurality of delivery conduits for distribution of the materials to the ground during normal operation or coupling with a sampling device for collection of the entire plurality of streams.

2. Description of the Related Art

In order to minimize seed and fertilizer costs while maximizing crop yield, it is necessary to uniformly distribute an optimum amount of seeds and fertilizer per acre of field. Presently available seed and fertilizer distribution implements typically utilize some form of adjustable metering device which is to be set according to manufacturer suggested settings for obtaining approximately the desired delivery rate of pounds of seed per acre.

Specific prior practices include the use of a plurality of metering wheels which deliver a corresponding plurality of metered seed streams from a seed supply. The metering wheels turn in response to forward movement of the farm implement and are geared so as to approximately meter the desired amount of seeds and fertilizer over the ground traversed by the implement. The gears may be adjusted according to manufacturer suggested settings in order to adjust the metered rates to correspond to changes in the type of seeds or fertilizers being applied or the quality of soil to be traversed. In addition to gearing the metering wheels according to a manufacturer's suggested setting, attempts to obtain a metered rate approximating the desired optimum rate have involved collecting a sample from one of the plurality of seed streams, estimating the entire application rate by multiplying the sampled rate by the entire number of seed streams and then adjusting the gears until this estimated entire application rate equals to the desired optimum rate.

The cited prior practices have a number of problems or shortcomings. Relying entirely upon manufacturer suggested settings for determining the gear setting necessary to apply the desired optimum rate of seeds or fertilizer can result in actual application rates differing substantially from the desired optimum rate due to variations in the types and conditions of materials being metered. Furhermore, the prior practice of adjusting the estimated entire application rate until it approaches the desired optimum rate can also result in a substantial difference between the actual application rate and the desired optimum rate due to variations in flow rates among the plurality of seed streams. Furthermore, simultaneous sampling of all of the seed streams of the prior distribution devices at their outlets would be somewhat difficult due to the typically large number of streams involved and due to the discharge points for those streams being at spaced apart locations across the entire width of the furrow opening implement.

Consequently, a need exists for improvements in seed and fertilizer metering devices which will provide for a determination of the actual seed and fertilizer distribution rates and adjustment thereof.

SUMMARY OF THE INVENTION

Accordingly, the present invention provides an agricultural seed metering and distribution apparatus having a seed stream sample collector designed to satisfy the aforementioned needs and overcome the aforementioned shortcomings of the prior practices. The entire plurality of seed streams of the apparatus can be collected in one sample collector for a quick and easy determination of the actual amount of seeds or fertilizer being metered from the apparatus. The metered rate may then be adjusted so as to deliver the desired metered rate. Furthermore, the downstream ends of the transfer conduits which deliver the seed streams to the collector are grouped into a unit for quick and easy coupling to and uncoupling from the collector. The unit may also be quickly and easily coupled to a corresponding grouping of upstream ends of delivery conduits for communication therewith for the ultimate distribution of the seeds to the ground during normal planting operations.

BRIEF DESCRIPTION OF THE DRAWINGS

FIG. 1 is a fragmentary, side elevational view of a seed planting implement utilizing a sample collector constructed in accordance with the principles of the present invention;

FIG. 2 is a fragmentary, right front perspective view of the hopper portion of the implement;

FIG. 4 is an enlarged, fragmentary exploded view of the sample collector associated with the seeding implement;

FIG. 5 is an enlarged, fragmentary, side elevational view of the sample collector with the distribution conduits aligned to deliver seed back to the field cultivator of the machine, a transverse frame member of the machine being shown in cross-section;

FIG. 6 is a fragmentary, side elevational view of the collector similar to FIG. 5 but with the distribution conduits positioned for sample collecting rather than deliverance of the seeds to the cultivator, portions being broken away and shown in cross-section to reveal details of construction; and FIG. 7 is an enlarged, fragmentary, side elevational view of the sample collector with the delivery conduits in transferring position with parts broken away to reveal details of construction.

DETAILED DESCRIPTION OF THE INVENTION

Figure 3:
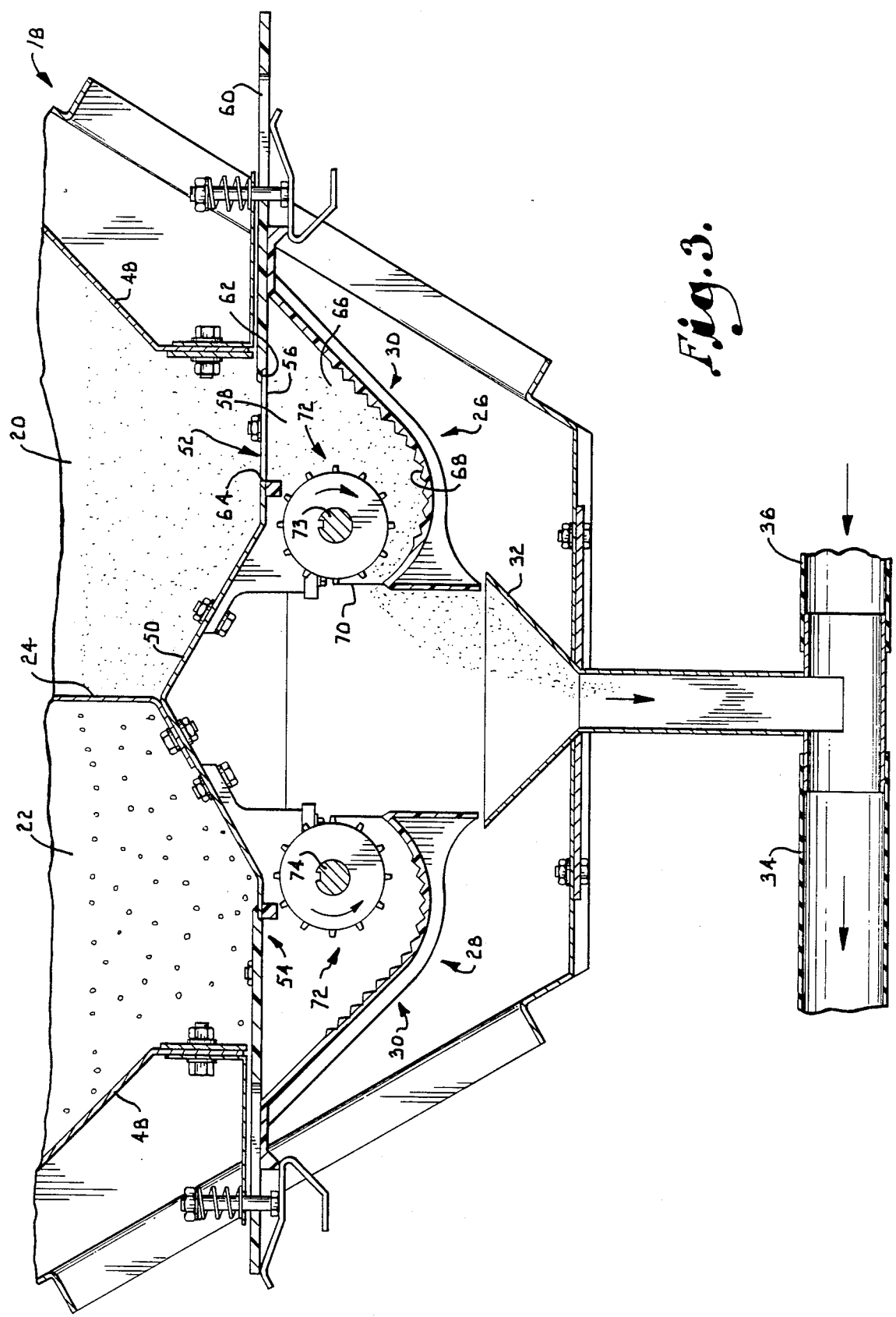
FIG. 3 is an enlarged, fragmentary cross-sectional view of the hopper portion of the implement taken substantially along a fore-and-aft imaginary line through the hopper portion.

A farm implement 10 as shown in FIG. 1 in the nature of an air seeder is adapted for use with a towing tractor (not shown) and is attached to such tractor by forwardly extending tongue 12 of a frame 14. A field cultivator 15 having a wheeled frame 17 from which a plurality of openers 19 depend is pivotally attached (by means not shown) to the rear of the seeder frame 14 between ground wheels 16 of frame 14 to permit the seeder-cultivator assembly to articulate during turns.

As shown in FIG. 3, a hopper 18 of the seeder 10 is subdivided into two fore-and-aft sections 20, 22 by a vertical laterally extending internal partition 24 so that the hopper 18 can carry a supply of two separate and distinct types of materials, such as seeds in front section 20 and granular fertilizer in rear section 22.

Two horizontal lines 26, 28 of seed cups 30 (shown in vertical cross-section in FIG. 3) are located on opposite sides of the hopper 18 adjacent the bottom of the latter for controlling distribution of the contents of hopper 18. Only one cup 30 is shown in cross-section from each line 26, 28 but it will be understood that each line contains a series of side-by-side cups extending across the width of the hopper. Line 26 of cups 30 communicates at its upper end with the interior of hopper section 20, and line 28 of cups 30 communicates at its upper end with the interior of hopper section 22. The cups 30 of line 26 are opposed fore-and-aft by corresponding cups 30 on line 28 (one such pair is shown in cross-section in FIG. 3) and each pair of opposed fore-and-aft cups shares a common funnel 32 into which either of the two cups may discharge metered volumes of materials. Each funnel 32, in turn, dumps into a transfer conduit 34 leading to the furrow opener 19 for ultimate distribution of the metered materials to the ground. An air supply line 36 leads from a blower 38 and is in communication with the upstream end of the transfer conduit 34 for delivering a stream of air thereto. All of the conduits 34 lie side-by-side in a substantially horizontal plane underneath and across the width of the hopper 18.

The hopper 18 includes a top 44 which has lids 46 that may be lifted for filling the interior of the sections 20, 22 and further includes a pair of laterally spaced apart hopper sides 48 (only the right hand side being shown in FIG. 1), a bottom 50 and the transverse center partition 24. The bottom 50 includes two horizontal lines 52, 54 of delivery ports 56 (shown in vertical cross-section in Fig. 3), which are in vertical registration with respective lines 26, 28 of the cups 30. Only one delivery port 56 is shown for each line 26, 28 of cups 30, but it will be understood that each cup 30 has a corresponding delivery port 56 in vertical registration therewith. The cups 30 have open tops and inlets 58 at those open tops which communicate with corresponding delivery ports 56 for receiving particles from the hopper 18.

Communication between the hopper 18 and each of the cups 30 via ports 56 and inlets 58 may be selectively opened and closed by slides 60 associated with each cup 30. Thus each line of cups 30 may be selectively opened and closed by the slides 60 associated with that line of cups 30. In this respect, it will be noted by comparing left and right cups 30 in FIG. 3 that each slide 60 may be slid horizontally between an open position opening the port 56 as illustrated by the righthand slide 60 in FIG. 3 and a closed position closing the port 56 as illustrated by the lefthand slide 60 in FIG. 3. As also illustrated in FIG. 3, each of the slides 60 is undercut along its front edge to present an overhanging lip 62 supported by a corresponding ledge 64 in the bottom 50 of the hopper 18 when the slide 60 is closed.

Each cup 30 further includes a pair of spaced apart vertical sidewalls 66 (only one being shown for each cup in FIG. 3) defining the lateral extremes of the interior of the cup 30 and a generally concave, upwardly curved floor 68 which extends laterally between the two sidewalls 66 and which cooperates with the sidewalls 66 to define the upper inlet 58 and a discharge outlet 70 spaced from the inlet 58. Each of the cups 30 is provided with its own metering rotor 72 which is located between the inlet 58 and the cup outlet 70 for engaging and impelling particles out of and through the outlets 70 at a metered rate of feed. A common shaft 73 runs through the rotors 72 of line 26 of speed cups 30, and correspondingly a common shaft 74 runs through the rotors 72 of the line of cups 28. Each rotor 72 is keyed to its corresponding shaft 73 or 74 for rotation therewith. As illustrated, the disposition of the rotors 72 within the respective cups 30 is such that rotor 72 is generally adjacent the outlet 70 and spaced a short distance above the cup floor 68 so as to provide a somewhat confined passageway through which the particles move from within the hopper 18 or the cups 30 toward the outlet 70 thereof.

The two shifts 73,74 are driven by the ground wheels 16 of the implement as it moves across the field so that the ground speed of the implement determines the rotational speed of metering rotors 72. The specific means by which shafts 73,74 are driven by wheels 16 is well understood by those skilled in the art and thus will be only briefly discussed herein. In this respect, although not illustrated in the drawings, it is to be understood that separate, adjustable transmissions are provided for the shafts 73,74 such that the drive ratio between shafts 73,74 and the ground wheels may be independently adjusted. An adjustable transmission setting lever 89 is located on the outside of the hopper 18 and is operably coupled with the transmission of shaft 73 for adjusting and establishing the speed ratio between shaft 73 and ground wheels 16. Thus, the transmissions serve as means for associating the rate of particle metering from the metering means with the rate that the implement traverses the ground. A similar adjustable transmission setting lever (not shown) is associated with the second transmission for adjusting and establishing the speed ratio between the other metering shaft 74 and ground wheels 16. Each adjustment lever 89 has its own calibration index 91 associated therewith and affixed to the outside of the hopper 18 for setting the adjustment lever 89 and thus the inner workings of the transmission according to a standardized manufacturer's chart which sets forth suggested transmission settings for obtaining a desired metered rate of seed from the corresponding rotors 72.

Furthermore, it will be noted in FIG. 2 that at the front of the machine is disposed a small diameter, horizontally extending input shaft 90 which is operably coupled with the aforementioned transmissions through a fore-and-aft extending chain and sprocket assembly 92. Shaft 90 is rotatably received within a larger diameter horizontal tube 94 extending across the front of the machine. A chain and sprocket assembly (not shown) at the outboardmost end of input shaft 90 drivingly connects the shaft 90 with a drive wheel 96 normally engaged at its periphery with the proximal ground wheel 16 so as to rotate input shaft 90 when ground wheel 16 rotates. A fore-and-aft extending swing arm 98 is fixed at its forward end to the outboard end of horizontal tube 94 and carries drive wheel 96 at its rear end. Tube 94 is carried by the machine in a manner to permit limited rotational, rocking movement about its longitudinal axis, at least to such an extent that drive wheel 96 may be swung into and out of contacting engagement with ground wheel 16 (see FIG. 1). Such limited rotation of tube 94 is accomplished by a hydraulic cylinder 99 interconnecting the frame of the machine with an operating crank 100 on tube 94. When pressure is relieved in cylinder 99, a tension spring 102 interconnecting the frame of the machine and the swing arm 98 yieldably biases drive wheel 96 against ground wheel 16. A fold-out hand crank 104 associated with drive wheel 96 may be flipped out from its stowed position of FIG. 1 to an operating position of FIG. 2 to permit manual rotation of drive wheel 96 when the latter is disengaged from ground wheel 16 for operating the metering rotors 72 a predetermined amount for seed sampling as will be hereinafter described.

As previously mentioned, the particles are metered from the cups 30 into the funnels 32 and then into the transfer conduits 34. The blower 38 forces a stream of air down through the transfer conduits 34 thereby entraining the metered streams of materials and delivering the same downstream to the downstream ends of the conduits 34. At the downstream end of conduits 34, a coupling assembly 110 releasably connects and communicates conduits 34 with conduits 144 on the trailing tillage implement. As shown in FIG. 4, part of the coupling assembly 110 includes a mounting plate member 118 which has a plurality of cylindrical fittings 120 that telescopically receive the downstream ends of the transfer conduits 34. The mounting plate 118 serves as a means for grouping the ends of the transfer conduits 34 together for movement as a unit. Ring clamps 125 tightly clamp the conduits 34 onto the fittings 120 in air tight sealing engagement therewith. The rear side of the plate 118 has a relatively flat surface 122 (FIGS. 5, 6 and 7) which has a plurality of holes 124 (FIG. 7) defined by and aligned with the downstream ends of the fittings 120.

The coupling assembly 110 further includes a panel structure 126 provided with a plurality of cylindrical fittings 128 (FIG. 7) extending outwardly and rearwardly from an upper portion of the panel 126. Delivery conduits 144 from the cultivator 15 are slipped onto fittings 128 and held in place by ring clamps 144a (FIG. 7). The panel 126 serves as a means for uniting the upstream ends of the delivery conduits 144. The front side of the upper portion of panel 126 has a relatively flat panel surface 130 which has a plurality of holes 129 aligned with the upstream ends of the fittings 128. A flat, substantially rectangular sealing gasket 131 is affixed to the flat surface 130 of the panel 126 and is perforated to provide openings aligned with holes 129. The fittings 128 are arranged in mirror image of the fittings 120 so that when the plate 118 and the panel 126 are placed in face-to-face engagement, each fitting 120 is in axial alignment with its corresponding mirror image fitting 128 so as to permit the particle streams to flow from the conduits 40 into the conduits 144.

The plate 118 and the panel 126 are located in proper registration with one another by a pair of laterally spaced apart locating pegs 134 which extend forwardly and outwardly from the uppermost corners of the panel surface 130 and are received by corresponding receiving apertures 136 (FIG. 7) located in the uppermost corners of the plate 118. The coupled pegs 134 and apertures 136 limit the vertical movement of the plate 118 relative to the panel 126. Opposite lateral edges of the panel 126 are provided with flat vertical guide strips 138. A pair of over-center locking clamps 142 (only one being illustrated) on the plate 118 releasably lock the plate 118 against panel 126. Each clamp 142 includes a handle 140 swingable about an upright pivot 141 on the side of plate 118 and horizontally swingable, hook-shaped latching finger 143 pivotally coupled with handle 140 intermediate its ends. The fingers 143 hook around the rear edges of strips 138 for releasably maintaining the plate 118 and the panel 126 in tight interengagement.

Each of the delivery conduits 144 leads to a corresponding corrugated pipe 146 which in turn leads to a distributor 147 for dividing the air entrained seed stream into a plurality of substantially uniform smaller air entrained seed streams. The smaller air entrained seed streams then enter hoses 148 and travel through the hoses 148 exiting the downstream ends thereof behind furrow openers 19 and into furrows in the ground.

The panel 126 has a lower portion which forms the front side of a seed sample collector, broadly denoted by the numeral 150. A rectangular inlet 152 of the sample collector 150 is located in the lower portion of the panel 126 for the flow of air entrained seed streams therethrough. The plate 118 can be released from its tight engagement with the panel 126 and its retention by pegs 134 by unclamping the over-center clamps 142 so as to unhook the fingers 143 from the strips 138 and then pulling the plate 118 forwardly to a limited extent. Rigid guide hooks 154 extend rearwardly from the lateral sides of the plate 118 and hook inwardly behind and around the rear edges of support strips 138 for limiting the distance plate 118 can be pulled forwardly from panel 126. Hooks 154 also serve to guide the plate 118 along the panel 126 when plate 118 is manually shifted up and down between an operating position as shown in FIG. 5 and a sampling position, a shown in FIG. 6. Once the plate 118 has been lowered to the collector inlet 152, the plate 118 can be coupled with the collector inlet 152 in face-to-face engagement for delivering a plurality of seed streams from the transfer conduits 34 into the sample collector 150 by relatching locking clamps 142.

The sample collector 150 further includes a separating section 156 wherein air is removed from the collected air entrained seed sample. The separating section 156 has a horizontal top wall 158 (FIG. 4), a pair of laterally spaced apart sidewalls 160, a transverse, rear seed screen 162 extending between the rear extremes of the sidewalls 160, and a front side formed by the lower portion of the panel 126 wherein the sample collector inlet 152 is located. The separating section 156 is open at the bottom and has a pair of opposite downwardly and inwardly sloping wall sections 164 that converge toward a lowermost discharge chute 166. The mesh of screen 162 is sufficiently fine to allow the escape of air, yet prevent the passage of seeds therethrough and as a result, the seeds, due to gravitational forces, drop through chute 166.

A generally L-shaped mounting flange 165 is fixedly attached to the outside of each sidewall 160, extending rearwardly therefrom, and has an outturned transverse portion engaged with a transverse, rectangular in cross-section, beam 167 of the cultivator frame 17. A U-shaped bolt 169 fits around the beam 167 and has a pair of vertically spaced apart legs 171 which extend forwardly around the beam 167 and through the outturned transverse portion of each flange 165 for coupling the flange 165 to the transverse beam 167 for carrying the sample collector 150 thereon.

The discharge chute 166 has a pair of vertical, laterally spaced apart sidewalls 173 and a pair of fore-and-aft spaced apart transverse walls 175 extending between the sidewalls 173. The chute 166 communicatively depends from the separating section 156 for receiving the seeds therefrom and delivering the seeds downward into a bag 170. The sidewalls 173 and transverse walls 175 of the section 166 each have an outer bag hook 168 extending outwardly therefrom which curves upwardly for the attachment of bag 170. The bag 170 is made of burlap or the like and has four circumferentially spaced ringlets 177 at its open end for slipping over hooks 168 on walls 173,175.

OPERATION

In use, either the front or rear section of the hopper 18 is initially filled with seed or granular fertilizer and the corresponding front or rear line of cups 26, 28 will be used to meter the particles from the hopper as the seeder 10 and cultivator 15 are drawn across a field. It is also possible to fill the front and rear sections 20, 22 with different types of particles and meter from both the front and rear lines 26, 28 of cups 30. Cover slides 60 are associated with each of the cups 30 for selectively opening or closing the cup inlets 58 thereby permitting the operator to selectively block off either a given cup or an entire line of cups so as to meter seeds from only one hopper section.

During planting, the metering rotors 72 within the seed cups 30 are ground driven so as to be coordinated with the speed of forward travel of the ground wheel 16. Drive wheel 96 is biased into engagement with the ground wheel 16 by spring 102, thereby causing firm engagement so that as the ground wheel 16 rotates, the frictional force between the ground wheel 16 and the drive wheel 96 will cause the drive wheel 96 to rotate in an opposite rotational direction from that of the ground wheel 16. The transmissions of the rotors 72 interrelate the ratio of revolutions of the rotors 72 to the drive wheel 96. Adjustment of the transmissions can be manually accomplished by adjusting the position of the appropriate adjustment lever 89 relative to the calibration index 91.

During planting, the seeds gravitate from the hopper 18 into the cups 30 and are subjected to the metering rotors 72 which deliver metered streams of seeds therefrom into the funnels 32 and then on into the transfer conduits 34. Forced air from the blower 38 entrains the seed streams and carries them downstream through the downstream ends of the condutis 34. Each air entrained seed stream then remains separate and distinct from the other seed streams as each seed stream travels through the downstream end of its respective transfer conduit 34, into its corresponding fitting 120 of plate 118, and then into its corresponding delivery conduit 144. Each seed stream then flows through its delivery conduit 144 and into and through its corresponding corrugated pipe 146 and corresponding distributor 147. Each air entrained seed stream is then divided by its distributor 147 into a plurality of smaller uniform seed streams. The smaller seed streams flow from the downstream end of the distributors 147 into and through hoses 148 to the ground behind the furrow openers 19.

Although the transmissions can be set according to standardized charts for delivering approximately the desired amount of seeds per acre, the actual delivery rate may differ significantly for a given transmission setting from the delivery rate predicted by the standardized chart. This variation can result from variations in seed size, seed moisture content, or metering apparatus conditions. But, by actually sampling the seeds delivered from the entire plurality of metering rotors 72 for a certain number of revolutions of the drive wheel 96 corresponding to the number of revolutions that would occur if a certain amount of acreage was traversed, the operator can determine the actual amount of seeds that will be metered per acre. The operator can adjust the position of the adjustment lever 89 relative to the calibration index 91, thereby adjusting the transmission in order to obtain an actual metering rate closer to the desired metering rate.

The most appropriate time to adjust the actual metering rate to the desired metering rate is just prior to planting. In order to determine the actual metering rate from one section of the hopper 18, the following steps need to be followed. First, a supply of seeds must be present in the selected hopper section. The line of cups 30 associated with the other section of the hopper 18 should be blocked off with the slides 60 so that seeds can be metered from only the section to be sampled from. Testing only one section of the hopper 18 at a time is important if different types of materials are to be contained in the two sections and the metered rate for one particular type of material is to be determined. However, if the same type of material is to be contained in each section, then it would be appropriate to test the combined metering rates from the two sections 20, 22 thus not requiring that one of the lines of cups 30 be blocked off by the slides 60.

Next, the plate 118 is disconnected from the panel 126 by unclamping the over-center clamps 142 by pivoting the handles 140 rearward about the pivots 141 and loosening the fingers 143 from the guide strips 138, and pulling the plate 118 forward and away from the panel 126 thereby uncoupling the apertures 136 and the pegs 134. The guide hooks 154 will limit the outward movement of the plate 118 relative to the panel 126, but will permit the plate 118 to be slid downwardly, taking the downstream ends of the transfer conduits 34 therewith.

As the plate 118 is moved downward, the guide hooks 154 track along the guide strips 138 until the bottom of the plate 118 engages a pair of laterally spaced apart ears 163 that extend outwardly and forwardly from the lowermost extreme of the front side of the sample collector 150 below the inlet 152. Upon engagement of the bottom of the plate 118 with the ears 163, the plate 118 will be located adjacent and face-to-face with the inlet 152 of the sample collector 150 so that the downstream ends of the transfer conduits 34 and the fittings 120 are in direct communication with the inlet 152 for delivering a plurality of seed streams thereto. The plate 118 is then clamped with the over-center clamps 142 to the outer strips 138 of the sample collector 150 by hooking the fingers 143 behind the guide strips 138 and pivoting the handles 140 forwardly until the handles 140 are brought into a fore-and-aft position. Once the transfer conduits 34 are in communication with the sample collector 150, the blower 38 is actuated to blow air through the transfer conduits 34 in order to force any residual seeds from the transfer conduits 34 through the sample collector 150 and onto to the ground. The collecting bag 170 should then be attached, by way of slipping the ringlets 177 over the bag hooks 168, to the lower discharge end of the chute 16 for collecting the soon to be metered seeds therefrom.

Based on the width of the cultivator 15, the standardized manufacturer's chart will indicate the transmission setting recommended for metering approximately the desired amount of seeds per acre. For an initial approximation for delivering the desired metering rate, the transmission setting by way of the adjustment lever 89 and the calibration index 91 should be set according to the chart for the line of cups of the section of the hopper which is to be metered from.

By activating the hydraulic cylinder 99, the arm 98 is pivoted upwardly about the longitudinal axis of the tube 94, thereby moving the drive wheel 96 out of engagement with the ground wheel 16 for permitting rotation of the drive wheel 96 independently of the ground wheel 16. The crank 104 can then be unfolded from its inner storage position to its output leverage position for providing leverage about the axis of rotation of the drive wheel 96 for manual rotation of the latter.

Next, using the crank 104 the drive wheel 96 should be manually rotated a number of turns corresponding to a certain amount of sample acreage, for example one-quarter acre. The relevant number of turns of the drive wheel 96 can be determined either from a standardized manufacturer's chart based on the width of the cultivator 15 or can be mathematically determined by dividing the sample acreage in square feet by the width in feet of the cultivator 15 and dividing this quotient by the circumference of the drive wheel 96 in feet. The operator then by use of the crank 104 turns the drive wheel 96 the appropriate number of turns corresponding to the turns that would result from traversing the sample acreage. Turning the drive wheel 96 will cause the rotors 72 to rotate, thereby metering seeds from the open seed cups 30. The metered seeds then fall into the funnels 32 and into the transfer conduits 34 wherein air from the blower 38 carries the seeds downstream and into the inlet 152 of the sample collector 150 wherein the air exits through the rear screen 162 and the seeds drop into the sample bag 170, thereby obtaining a metered sample corresponding to the sample acreage.

The sample weight can be translated into the amount of seeds which will be delivered by the implement per acre traversed. In practice, the seed collecting bag 170, after having collected a sample, will be removed from the sample collector 150 and weighed on a suitable scale not shown. Then by subtracting the bag weight from the total weight of the bag and sample, the actual weight of the sample is determined. By dividing the sample weight by the sample acreage, the actual metered rate in pounds per acre is determined. The operator then compares the actual metered rate with the desired metered rate and adjusts the relevant transmission box accordingly by shifting the position of the adjustment lever 89 along the calibration index 91 so as to reduce the difference between the actual rate and the desired rate.

One way of determining the appropriate degree of adjustment is by subtracting the present index setting from the next higher index setting, dividing this difference by the difference between the metered rates indicated by manufacturer's chart for those index settings, and then multiplying this quotient by the difference between the desired rate and the actual rate. The resulting product will be the change in the index setting of the adjustment lever necessary to obtain a metered rate equal to the desired rate.

In the alternative, another sample can be obtained to determine if the new adjusted metering rate is sufficiently close to the desired metering rate to start planting.

The implement is then brought back into readiness for normal use by simply unclamping the plate 118 from the panel 126 adjacent the inlet of the sample collector 150, sliding the plate 118 up into face-to-face engagement with the gasket of the panel 126 so the panel pegs 134 are snapped into the peg receiving apertures 136 and reclamping the plate 118 and panel 126 together. Then, the hydraulic cylinder 99 is actuated for reengagement of the drive wheel 96 with the ground wheel 16 so that the rotors 72 will meter the seeds in response to rotation of the ground wheel 16 as the implement traverses the field.

We claim:

1. In a farm implement for dispensing particles having a mobile frame, apparatus mounted on said frame for containing a supply of particles to be dispensed, metering means for delivering a plurality of metered particle streams from said apparatus, a corresponding plurality of transfer conduits for receiving said plurality of particle streams, an air blower in upstream communication with said transfer conduits for providing a particle entraining stream of air for entraining said particle streams and conveying said particles downstream through said transfer conduits, corresponding delivery conduits in downstream communication with said transfer conduits for delivering said air entrained particle streams to the ground, the improvement comprising:

means for grouping the downstream ends of said transfer conduits together for movement of said transfer conduit ends as a unit, means for uniting the upstream ends of said delivery conduits, said uniting means also including a sample collector inlet opening, a particle sample collector in communication with the collector inlet opening, means for releasably coupling said grouping means with said uniting means to alternately communicate the downstream ends of said transfer conduits with said collector inlet for directing flow of the air stream from said transfer conduits through said inlet into said sample collector and alternately coupling said grouping means with said upstream ends of said delivery conduits, said collector having a screen plate spaced from and parallel to the inlet opening for permitting the passage of air therethrough and retaining the particles within said collector.

2. In the farm implement as claimed in claim 1, wherein said grouping means is a plate having a plurality of upstream extending annular plate fittings coupled with the downstream ends of said transfer conduits for receiving the air entrained particle streams therefrom.

3. In the farm implement as claimed in claim 1, wherein said collector has an annular discharge chute located beneath said inlet and in communication therewith for the passage of particles therethrough, a particle collecting container releasably coupled with the downstream end of said chute for collecting the particles which pass therethrough.

4. In the farm implement as claimed in claim 1, wherein said metering means includes means for permitting the operator to manually operate the meters in a predetermined amount.

5. In the farm implement as claimed in claim 1, wherein said metering means has a series of metering rotors, means associated with said metering rotors for turning the metering rotors through a predetermined number of turns.

6. In the farm implement as claimed in claim 1, wherein said uniting means includes a panel having a plurality of downstream extending panel fittings communicatively coupled with the upstream ends of said delivery conduits.

7. In the farm implement as claimed in claim 6, wherein each of said plate fittings is axially aligned with the corresponding panel fitting.

8. In the farm implement as claimed in claim 1, the improvement further comprising:
means for associating the rate of particle metering from the metering means with the rate that the implement traverses the ground; and
means for adjusting the ratio between the metering rate and the traversing rate.

* * * * *